(12) United States Patent
Hall et al.

(10) Patent No.: US 10,379,251 B2
(45) Date of Patent: Aug. 13, 2019

(54) OBSCURED-FEATURE-FINDING AND DEVICE-MOUNTING APPARATUS

(71) Applicants: David R. Hall, Provo, UT (US); Jerome Miles, Spanish Fork, UT (US); Joe Fox, Spanish Fork, UT (US); Jedediah Knight, Provo, UT (US)

(72) Inventors: David R. Hall, Provo, UT (US); Jerome Miles, Spanish Fork, UT (US); Joe Fox, Spanish Fork, UT (US); Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 219 days.

(21) Appl. No.: 15/605,518

(22) Filed: May 25, 2017

(65) Prior Publication Data
US 2018/0341038 A1  Nov. 29, 2018

(51) Int. Cl.
| | | |
|---|---|---|
| *G01R 27/26* | (2006.01) | |
| *G01V 3/38* | (2006.01) | |
| *G01V 3/12* | (2006.01) | |
| *G01V 8/20* | (2006.01) | |
| *F16M 13/02* | (2006.01) | |
| *F21Y 115/10* | (2016.01) | |

(52) U.S. Cl.
CPC .................. *G01V 3/38* (2013.01); *G01V 3/12* (2013.01); *G01V 8/20* (2013.01); *F16M 13/02* (2013.01); *F16M 13/027* (2013.01); *F21Y 2115/10* (2016.08)

(58) Field of Classification Search
USPC .......................................... 324/658, 660–663
See application file for complete search history.

(56) References Cited

U.S. PATENT DOCUMENTS

2007/0284492 A1* 12/2007 Oh ......................... F16M 11/06
                                                            248/220.1

* cited by examiner

*Primary Examiner* — Vincent Q Nguyen

(57) ABSTRACT

The apparatus described herein may include a base plate, one or more walls, one or more obscured feature detectors, one or more obscured feature indicators, a controller, and a power source. The base plate may include one or more surface-mounting structures that mount the apparatus to a surface. The walls may extend at least partially perpendicularly from the base, and may include one or more device-mount structures that mount one or more removable devices to the walls. The detectors and indicators may be connected to the base, the walls, or both. Each detector may correspond to at least one of the surface-mounting structures. Each indicator may correspond to at least one of the detectors. The controller may be electrically connected to the detectors and the indicators. The controller may activate the indicators as the detectors detect a feature obscured behind a surface adjacent to the detectors.

20 Claims, 17 Drawing Sheets

US 10,379,251 B2

OBSCURED-FEATURE-FINDING AND DEVICE-MOUNTING APPARATUS

TECHNICAL FIELD

This invention relates generally to the Internet of Things and more specifically to smart home devices.

BACKGROUND

Garage organization is, for some, the bane of homeownership. The struggle to organize many tools and miscellaneous items of greatly varying shapes and sizes has led to some innovation in garage storage systems. However, most systems are based on the similar concept of creating an overhead floor on which store things. This may be convenient for items that are not frequently used, but is sorely inadequate for items that are frequently accessed, especially for tools. Tools may be stored in more convenient, ground-based boxes or in cabinets, but this may be inconvenient for regularly used tools such as power cords, speakers, compact lifters, and lights, among others. It may be convenient to store such tools in an out-of-the-way location and still have ready access to them. Such a need is amplified by the fact that remote control of such tools is becoming more common. Additionally, more capable and convenient solutions are needed for installing overhead storage systems. Thus, there is room for improvement in garage organization solutions.

SUMMARY OF THE INVENTION

Embodiments of a device-to-surface mounting apparatus are described herein that address some of the problems in the state of the art, such as described above in the Background. The apparatus may include a channel, a plurality of ring-shaped capacitors, a plurality of LEDs, a controller, a battery, or combinations thereof. The channel may include a base, two walls extending perpendicularly from opposing ends of the base, and a plurality of openings disposed in the base. One or more devices may mount to the walls. Each plate capacitor may correspond to, and encircle, at least one of the openings. The capacitors may be disposed within the channel along an outer surface of the base. Each LED may correspond to at least one of the capacitors. Each LED may be disposed closer to the at least one opening corresponding to the at least one corresponding capacitor than any other opening. The LEDs may be oriented to emit light towards an inner portion of the channel. The controller may be electrically connected to the capacitors and the LEDs. The controller may be mounted to an inner surface of the channel. The controller may light LEDs corresponding to capacitors that indicate to the controller alignment of the corresponding openings over studs behind a surface adjacent to the channel. The battery may provide power to the controller, the LEDs, and/or the capacitors. The battery may be mounted to the inner surface of the channel.

The apparatus may include a channel, a plurality of radio frequency (RF) transmitters and transmitter antennas, a plurality of RF receivers and receiver antennas, a plurality of LEDs, a controller, a battery, or combinations thereof. The channel may include a base, two walls extending perpendicularly from opposing ends of the base, and a plurality of openings disposed in the base. One or more devices may mount to the walls. Each transmitter may correspond to at least one of the openings. Each transmitter antenna may be electrically connected to at least one of the transmitters. Each transmitter antenna may be disposed adjacent to the at least one corresponding opening. Each transmitter antenna may face outside the channel. Each transmitter may be tuned to a frequency unique from each other transmitter. Each receiver may correspond to at least one of the transmitters. Each receiver antenna may be electrically connected to at least one of the receivers. Each receiver antenna may be disposed adjacent to the at least one corresponding opening opposite the corresponding transmitter antenna. Each receiver antenna may face outside the channel. Each receiver may be tuned to the corresponding transmitter frequency. Each LED may correspond to at least one receiver. Each LED may be disposed closer to the at least one opening corresponding to the at least one corresponding transmitter than any other opening. The LEDs may be oriented to emit light towards an inner portion of the channel. The controller may be electrically connected to the transmitters, the receivers, and the LEDs. The controller may be mounted to an inner surface of the channel. The controller may light LEDs corresponding to receivers that receive signals from corresponding transmitters indicating to the controller alignment of the corresponding openings over studs behind a surface adjacent to the channel. The battery may provide power to the controller, the LEDs, the transmitters, and/or the receivers. The battery may be mounted to the inner surface of the channel.

The apparatus may include a base plate, one or more walls, one or more obscured feature detectors, one or more obscured feature indicators, a controller, a power source, or combinations thereof. The base plate may include one or more surface-mounting structures. The apparatus may be mounted to a surface by way of the surface-mounting structures. The walls may extend at least partially perpendicularly from the base. The walls may include one or more device-mount structures by which one or more removable devices may be mounted to the walls. The detectors may be connected to the base, the walls, or both. Each detector may correspond to at least one of the surface-mounting structures. The indicators may be connected to the base, the walls, or both. Each indicator may correspond to at least one of the detectors. The controller may be electrically connected to the detectors and the indicators. The controller may activate the indicators as the detectors detect a feature obscured behind a surface adjacent to the detectors.

The apparatus may include at least two opposing walls. The base and the walls may form a channel. At least two of the device-mount structures may include coaxial openings through the opposing walls.

At least one of the one or more surface-mounting structures may include an opening through the base. The obscured feature detectors may be removably disposed in the openings.

The detectors may be disposed adjacent to the surface-mounting structures, around the surface-mounting structures, or combinations thereof. The indicators may be disposed adjacent to the surface-mounting structures, around the surface-mounting structures, or combinations thereof. The detectors may be integrated with the base, the walls, or both. The indicators may be integrated with the base, the walls, or both. A face of at least on obscured feature detector may be parallel and/or coplanar with a surface-side face of the base plate. At least one of the indicators may be disposed along a side of the base plate opposite the surface-side face.

The detector may include one or more of a capacitor, a magnet, an inductor, an ultrasonic transmitter and receiver, an RF transmitter and receiver, or combinations thereof. At least one of the one or more detectors may include a ring-shaped plate capacitor encircling at least one of the one or more surface-mounting structures. At least one of the one or more detectors may include a ring-shaped magnet encircling at least one of the one or more surface-mounting structures. At least one of the detectors may include an RF transmitter and an RF receiver. The RF transmitter may be disposed adjacent to at least one of the surface-mounting structures. The RF receiver may be disposed adjacent to the at least one surface-mounting structure opposite the transmitter. At least one of the detectors may include an ultrasonic transmitter and an ultrasonic receiver. The ultrasonic transmitter may be disposed adjacent to at least one of the surface-mounting structures. The ultrasonic receiver may be disposed adjacent to the at least one surface-mounting structure opposite the transmitter.

The indicator may include a visual indicator, an audio indicator, or combinations thereof. The indicators may include variable strength indication. The indication may vary with an alignment of one or more of the detectors with an obscured feature behind a surface adjacent to the detectors.

The detectors and the indicators may be integrated into a body removable from the base, the walls, or both. The removeable body may connect to the base, the walls, or both by one or more sets of tracks and runners, by one or more magnets, by one or more clips, or combinations thereof.

BRIEF DESCRIPTION OF THE DRAWINGS

A more particular description of the apparatus summarized above is made below generally and by reference to specific embodiments. Several embodiments are depicted in drawings included with this application, in which.

DETAILED DESCRIPTION

Figure 1A:
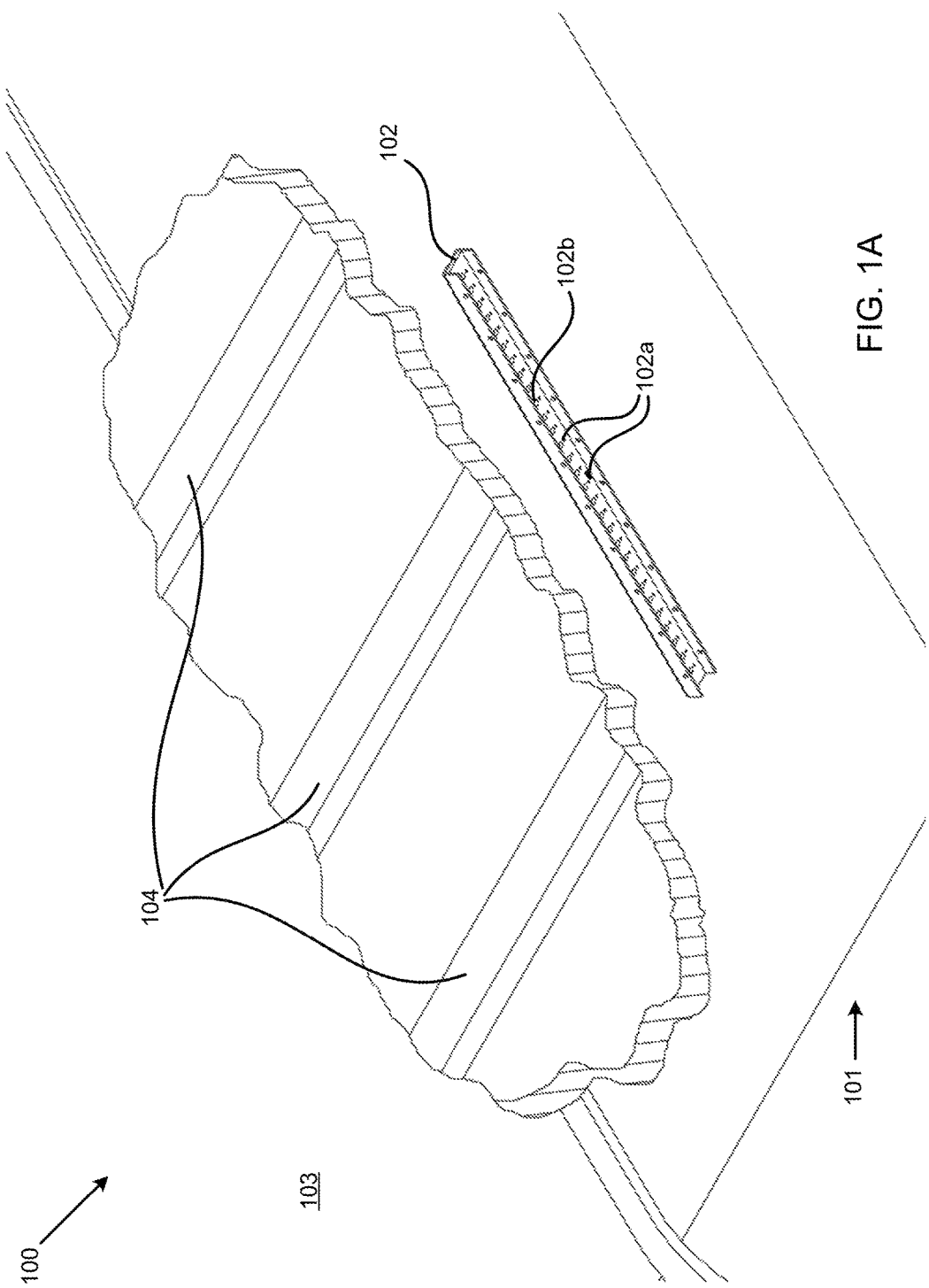
FIGS. 1A-B depict a scene of a device-to-surface mounting apparatus being installed overhead in a garage.

A detailed description of embodiments of an apparatus is provided below by example, with reference to embodiments in the appended figures. Those of skill in the art will recognize that the features of the apparatus as described by example in the figures below could be arranged and designed in a variety of different configurations without departing from the scope of the claims. Thus, the detailed description below and the depictions of embodiments in the figures is representative of the claimed invention, and is not intended to limit the scope of the claims.

Embodiments of a device-to-surface mounting apparatus are described herein. The apparatus may include a channel, a plurality of ring-shaped capacitors, a plurality of LEDs, a controller, and a battery. The channel may include a base, two walls extending perpendicularly from opposing ends of the base, and a plurality of openings disposed in the base. One or more devices may mount to the walls. Each plate capacitor may correspond to, and encircle, at least one of the openings. The capacitors may be disposed within the channel along an outer surface of the base. Each LED may correspond to at least one of the capacitors. Each LED may be disposed closer to the at least one opening corresponding to the at least one corresponding capacitor than any other opening. The LEDs may be oriented to emit light towards an inner portion of the channel. The controller may be electrically connected to the capacitors and the LEDs. The controller may be mounted to an inner surface of the channel. The controller may light LEDs corresponding to capacitors that indicate to the controller alignment of the corresponding openings over studs behind a surface adjacent to the channel. The battery may provide power to the controller, the LEDs, and/or the capacitors. The battery may be mounted to the inner surface of the channel.

The apparatus may include a channel, a plurality of radio frequency (RF) transmitters and transmitter antennas, a plurality of RF receivers and receiver antennas, a plurality of LEDs, a controller, a battery, or combinations thereof. The channel may include a base, two walls extending perpendicularly from opposing ends of the base, and a plurality of openings disposed in the base. One or more devices may mount to the walls. Each transmitter may correspond to at least one of the openings. Each transmitter antenna may be electrically connected to at least one of the transmitters. Each transmitter antenna may be disposed adjacent to the at least one corresponding opening. Each transmitter antenna may face outside the channel. Each transmitter may be tuned to a frequency unique from each other transmitter. Each receiver may correspond to at least one of the transmitters. Each receiver antenna may be electrically connected to at least one of the receivers. Each receiver antenna may be disposed adjacent to the at least one corresponding opening opposite the corresponding transmitter antenna. Each receiver antenna may face outside the channel. Each receiver may be tuned to the corresponding transmitter frequency. Each LED may correspond to at least one receiver. Each LED may be disposed closer to the at least one opening corresponding to the at least one corresponding transmitter than any other opening. The LEDs may be oriented to emit light towards an inner portion of the channel. The controller may be electrically connected to the transmitters, the receivers, and the LEDs. The controller may be mounted to an inner surface of the channel. The controller may light LEDs corresponding to receivers that receive signals from corresponding transmitters indicating to the controller alignment of the corresponding openings over studs behind a surface adjacent to the channel. The battery may provide power to the controller, the LEDs, the transmitters, and/or the receivers. The battery may be mounted to the inner surface of the channel.

The apparatus may include a base plate, one or more walls, one or more obscured feature detectors, one or more obscured feature indicators, a controller, a power source, or combinations thereof. The base plate may include one or more surface-mounting structures. The apparatus may be mounted to a surface by way of the surface-mounting structures. The walls may extend at least partially perpendicularly from the base. The walls may include one or more device-mount structures by which one or more removable devices may be mounted to the walls. The detectors may be connected to the base, the walls, or both. Each detector may correspond to at least one of the surface-mounting structures. The indicators may be connected to the base, the walls, or both. Each indicator may correspond to at least one of the detectors. The controller may be electrically connected to the detectors and the indicators. The controller may activate the indicators as the detectors detect a feature obscured behind a surface adjacent to the detectors.

The apparatus may include at least two opposing walls. The base and the walls may form a channel. At least two of the device-mount structures may include coaxial openings through the opposing walls.

At least one of the one or more surface-mounting structures may include an opening through the base. The obscured feature detectors may be removably disposed in the openings.

The detectors may be disposed adjacent to the surface-mounting structures, around the surface-mounting structures, or combinations thereof. The indicators may be disposed adjacent to the surface-mounting structures, around the surface-mounting structures, or combinations thereof. The detectors may be integrated with the base, the walls, or both. The indicators may be integrated with the base, the walls, or both. A face of at least on obscured feature detector may be parallel and/or coplanar with a surface-side face of the base plate. At least one of the indicators may be disposed along a side of the base plate opposite the surface-side face.

The detector may include one or more of a capacitor, a magnet, an inductor, an ultrasonic transmitter and receiver, an RF transmitter and receiver, or combinations thereof. At least one of the one or more detectors may include a ring-shaped plate capacitor encircling at least one of the one or more surface-mounting structures. At least one of the one or more detectors may include a ring-shaped magnet encircling at least one of the one or more surface-mounting structures. At least one of the detectors may include an RF transmitter and an RF receiver. The RF transmitter may be disposed adjacent to at least one of the surface-mounting structures. The RF receiver may be disposed adjacent to the at least one surface-mounting structure opposite the transmitter. At least one of the detectors may include an ultrasonic transmitter and an ultrasonic receiver. The ultrasonic transmitter may be disposed adjacent to at least one of the surface-mounting structures. The ultrasonic receiver may be disposed adjacent to the at least one surface-mounting structure opposite the transmitter.

The indicator may include a visual indicator, an audio indicator, or combinations thereof. The indicators may include variable strength indication. The indication may vary with an alignment of one or more of the detectors with an obscured feature behind a surface adjacent to the detectors.

The detectors and the indicators may be integrated into a body removable from the base, the walls, or both. The removeable body may connect to the base, the walls, or both by one or more sets of tracks and runners, by one or more magnets, by one or more clips, or combinations thereof.

The base plate and walls may be arranged as a u- or c-shaped channel. The channel may be similar to that described in U.S. patent application Ser. No. 15/487,999 by David Hall et al. for "Overhead Mounting System" and U.S. patent application Ser. No. 15/488,860 by David Hall et al. for "Overhead Mounting System for Daisy-Chained Devices." Various portions of those applications are reproduced below, and the entirety of each application is incorporated herein by reference.

The channel may be used to mount one or more devices to a surface. The surface may include a wall, a floor, and/or an overhead surface such as a ceiling. The channel may therefore need to be secured to the surface such that the channel may support the weight of the mounted devices. Accordingly, it may beneficial to mount the channel to the surface by, for example, driving one or more lag screws into studs behind the surface and to which the surface is mounted. The studs may be, for example, wood, aluminum, steel, and/or another alloy. One challenge installing the channel may be identifying where to drive the screws into the surface because the surface may obscure the studs. It may, therefore, be beneficial to integrate with the channel a device that identifies the position of studs obscured by the surface. It may further be beneficial to identify precisely where a stud aligns with an opening in the channel to streamline the process of securing the channel to the surface. Various embodiments of the apparatus described herein may, by design, provide such benefits.

The channel may accommodate wiring for the devices. The devices may be daisy-chained by wiring running along the channel. A detector/indicator body may be integrated with the channel or attached to the channel. The channel and/or detector/indicator body may be comprised of one or more materials. Such materials may include any of a variety of thermoplastics, including acrylic, ABS, nylon, PLA, polybenzimidazole, polycarbonate, polyether sulfone, polyetherether ketone, polyetherimide, polyethylene, polyphenylene oxide, polyphenylene sulfide, polypropylene, polystyrene, PVC, and/or Teflon, one or more metals, including aluminum, iron, steel, brass, and/or chrome, and/or one or more composite materials including carbon, carbon fiber, and/or fiberglass. Such materials may include combinations of the previously listed materials. In some embodiments, the channel is comprised of powder-coated steel and the detector/indicator body is comprised of ABS. In other embodiments, the detector/indicator body is integrated with the channel, and both are comprised of ABS.

In some embodiments, the channel may be mounted overhead to one or more trusses, such as in a garage. The channel may be mounted directly to the trusses, or may be mounted to the trusses through a ceiling such as a drywall ceiling. The channel base may comprise a plurality of external cleats comprising barbs protruding from the base for hands-free positioning on a mounting surface. The channel may be mounted to the ceiling by two lag bolts screwed into two truss beams. The lag bolts may pass through channel base openings. The channel may be mounted along a length of a single truss, perpendicular to a single truss, or perpendicular across two or more trusses. A significant problem in designing overhead mounting systems is the variability in inter-truss spacing. Depending on the type of construction and the builder, inter-truss spacing ranges, on average, from 16 inches to 24 inches. Thus, to capture at least a minimum of two trusses at the minimum average inter-truss spacing, the channel must have a length of at least 16 inches. Accordingly, the length of the channel may range from 16 inches to 48 inches in various embodiments. Another factor to consider when designing overhead mounting systems is the average number of devices a consumer will use and what inter-device spacing the average consumer will use.

The channel base may include a flat bar having a narrow width relative to its length. The length-to-width ratio may range from 6:1 to 48:1. The channel walls may extend from sides of the channel base along the length of the channel base. Each channel wall may form an angle with the channel base ranging from 45 degrees to 135 degrees, from 50 degrees to 130 degrees, from 60 degrees to 120 degrees, from 70 degrees to 110 degrees, from 80 degrees to 100 degrees, from 85 degrees to 95 degrees, from 89 degrees to 91 degrees, and/or 90 degrees. In some embodiments, the angle that each channel wall forms with the channel base may vary along the length of the channel. The channel base may comprise a plurality of external cleats comprising barbs protruding from the base for hands-free positioning on a mounting surface. In some embodiments, the channel walls may extend from opposite sides of the channel base. The channel walls may similarly include flat bars having narrow widths relative to their lengths. The channel wall length-to-width ratio may range from 6:1 to 48:1. The channel ends may be formed of the end-edges of the channel base and the channel walls and may run along the widths of the channel base and the channel walls.

In some embodiments, the channel base and/or the channel walls may be contoured. The contouring may be along edges of the channel base and/or channel walls, and/or may be along surfaces of the channel base and/or channel walls. The contouring may correspond to contouring in a surface to which the channel may be mounted, or a surface against which the channel may rest. In various embodiments, the contouring in the surface and/or the channel may be non-linear.

The channel base may comprise a plurality of external cleats comprising barbs protruding from the base for hands-free positioning on a mounting surface. The channel base may include a plurality of openings through which the channel base may be mounted to a surface. For example, one or more lag bolts, screws, and/or drywall fasteners may pass through the channel base openings. The channel base openings may have a larger diameter than the channel wall openings. The channel base openings may have a diameter ranging from half an inch to 1½ inches, from ¾ an inch to 1¼ inches, or may be one inch. The channel wall openings may have a diameter ranging from ⅛ an inch to ½ an inch. The channel base openings may be spaced from each other by a channel base inter-opening length. The channel base inter-opening length may range from half an inch to three inches, from one inch to 2½ inches, or from 1½ inches to two inches. The channel base inter-opening length may be shorter than the channel wall inter-opening length. The configuration of the channel openings may simplify installation by allowing a user to easily distinguish the channel base from the channel walls. Additionally, a closer channel base inter-opening spacing may more readily accommodate a variety of inter-truss spacings. The instant inventors have discovered that a ratio of three channel base openings for every two channel wall openings is optimal to balance the variability in inter-truss spacing and the variability in how consumers will typically use the channel. Accordingly, the channel may include three channel base openings for every two channel wall openings.

In general, the apparatus may include a base plate that has one or more surface-mounting structures by which the apparatus is mounted to a surface. As described above, the apparatus may include at least two opposing walls. The base and the walls may form a channel. The surface-mounting structures may include at least one opening in the base plate through which a lag screw may pass and mount the base plate to a surface. The base plate may include a plurality of openings. In various embodiments, the surface-mounting structures may include claws and/or cleats that extend from a surface-side of the base plate. The claws and/or cleats may secure the base plate to the surface temporarily as lag screws are drilled through openings in the base plate and into the surface and/or studs behind and/or obscured by the surface.

The apparatus may include one or more walls extending from the base. The walls may extend at least partially perpendicularly from the base, such as two walls extending perpendicularly from opposite sides of the base plate. One or more devices may be mounted to the apparatus via the walls. Accordingly, the walls may incorporate one or more of various device-mount structures. In some embodiments, the device-mount structures may include openings through the walls. Opposing openings may be coaxial or non-coaxial. A device may mount to the walls by, for example, a rod that passes through two coaxial, opposing openings, or by detents that rest in opposing openings. In various embodiments, the wall or walls may include one or more clips and/or fasteners by which devices are mounted to the wall/walls.

As described above, various features may be obscured by the surface. Such features may include solid support structures such as studs, support beams, and/or trusses; electrical wiring; and/or pipes that carry liquids and/or gasses. The obscured feature detectors may correlate to such obscured features to provide a user this information about the obscured features. Such information may include a position of the feature, a size of the feature, whether the feature includes metal, and/or whether the feature carries an electric current. Accordingly, the obscured feature detectors may include one or more mechanisms and/or devices functionally capable of detecting such obscured features. Such mechanisms and/or devices may include a capacitor, a magnet, an inductor, an ultrasonic transmitter and receiver, an RF transmitter and receiver, or combinations thereof. For example, each surface-mounting structure may correspond to a plate capacitor on one side of the structure and an inductor on the other side of the structure. The plate capacitor and inductor may each correspond to an LED indicator. The controller may store instructions relating to a capacitance threshold for the plate capacitor that indicates when the plate capacitor is aligned with a stud. The controller may light the capacitor LED when the threshold is met. The controller may further store instructions relating to detecting an AC current with the inductor. The controller may light the inductor LED when AC current is detected.

The obscured feature detector may include a plurality of plate capacitors. The plate capacitors may each have a shape corresponding to a shape of an opening in the base plate. The plate capacitors may be disposed in the base plate openings. The plate capacitors may each have a shape corresponding to an outer shape of the openings. For example, the apparatus may include a plurality of ring-shaped plate capacitors. The capacitors may encircle, and be disposed adjacent to, the openings.

The obscured feature detector may include one or more magnets. The magnets may be disposed adjacent to at least one of the one or more surface-mounting structures. For example, the structures may include openings, and each magnet may include a ring-magnet. Each ring magnet may encircle a corresponding opening. Each magnet may be disposed in the base plate behind an outer surface of the base plate adjacent to the mounting surface. The magnet may include an electrical contact, and the base plate may include an electrical contact. A weak spring may be disposed between the outer surface and the magnet, such that the two contacts are separated. As the magnet is positioned over a metallic subsurface feature, it may compress the spring and cause contact between the two contacts. Such contact may close an electrical circuit with a battery and an LED, lighting the LED and indicating the opening is near a metallic object. In some embodiments, multiple contacts and springs may be included to determine the position of the subsurface metallic feature relative to the magnet. The contacts and springs may be around along outer edges of the magnet, and LEDs may be associated with each set of contacts, such that a metallic subsurface object near a first side of the magnet causes the first-side LED to light, etc.

The obscured feature detector may include one or more inductors. At least two inductors may be included that are aligned perpendicular to each other and parallel to the base plate outer surface. This may allow for detection of AC current along multiple directions behind the mounting surface. Each inductor may be connected directly, in series, to diodes, which may emit light as the inductors generate AC current in response to being in the presence of AC current.

The obscured feature detector may include one or more transmitters and/or receivers. The transmitters and/or receivers may be RF or ultrasonic. The detector may further include transmitter antennas or speakers and receiver antennas or microphones corresponding to, and electrically connected to, each transmitter and receiver, respectively. Each transmitter may correspond to at least one of the surface-mounting structures in the base. Each transmitter antenna or speaker may be disposed adjacent to the structure, and may face outside the channel towards the mounting surface. Each transmitter may be tuned to a unique RF or ultrasonic frequency from each other transmitter. Each receiver may correspond to at least one of the transmitters. Each receiver antenna or microphone may be disposed adjacent to the at least one correspond surface-mounting structure opposite the corresponding transmitter antenna or speaker. Each receiver antenna or microphone may face outside the channel towards the mounting surface. Each receiver may be tuned to the corresponding transmitter frequency.

In various embodiments, the transmitter and receiver may be integrated. In various ultrasonic embodiments, an oscillator, such as a voltage- or current-controlled oscillator, acts as the transceiver, generating ultrasonic waves by the speaker, and tuned by the controller. The receiver may simply be a potentiometer that feeds a voltage reading to the controller.

RF and ultrasonic embodiments may detect the presence of obscured features behind a surface by comparing phase shifts. The transmitter may emit a pulse, and the receiver may listen for reflections of the pulse. The controller may be programmed to expect a specific range of mounting surface widths, and therefore may expect to hear a second reflection within a specific time-frame after hearing the initial reflection from the mounting surface. The width may range from ¼ inch to 1 inch. If the receiver does not receive a reflection within the expected timeframe, the controller may know that there is no feature immediately behind the surface to which the mounting apparatus may be mounted.

A spacing between the surface-mounting structures may be such that it may be beneficial to align dissimilar obscured feature detectors next to each other in succession. For example, a first opening may have a ring capacitor disposed around the opening. A second opening immediately next to the first opening may have a ring magnet disposed around the opening. A third opening immediately next to the second opening, the first opening, or both, may include an inductor. Such an arrangement may be beneficial for detecting features directly in line with where the apparatus may be mounted to the surface.

As described above, the surface-mounting structure may include openings in the base plate. In some embodiments, the obscured feature detector may be removably disposed within the openings. For example, the detectors and indicators may be integrated into a body removable from the channel, including the base, the walls, or both. The removable body may include an outer housing, such as a plastic housing, that connects to the channel by one or more sets of tracks and runners. The removable body may magnetically mount to the track. One or more clips may secure the removable body to the channel. In embodiments where the surface-mounting structures include openings, the body may include protrusions that stick through the openings. One or more detector embodiments may be disposed in the protrusions.

Each detector and indicator may be individually packaged with a separate controller and power source from the other detectors and indicators. In some embodiments, the packaging mounts removably to the base. For example, the packaging may be such that the detector fits in the opening.

The detectors may be integrated with the base, the walls, or both. For example, the base may form a hollow housing. The detectors, indicators, controller/controllers and power source/sources may be disposed within the base housing. One or both of the walls may form hollow housing within which the detectors, indicators, controller/controllers and power source/sources are housed. The channel may include structures that house and support the detectors, indicators, controller/controllers, and/or power source/sources.

The detectors may be aligned in the base and/or with the base surface in any of a variety of ways. For example, in some capacitor embodiments, the plate capacitor may be parallel and coplanar with the surface-mounting-side face of the base plate. In various inductor embodiments, the inductor/s may be disposed behind the base plate within the channel. In various transmitter/receiver embodiments, and/or magnet embodiments, the detector may be disposed within the base plate and/or channel such that the detector is adjacent to the mounting surface with an appreciable distance between the mounting surface and the detector.

Each obscured feature indicator may correspond to, and be electrically connected to, at least one of the obscured feature indicators. For example, each detector may correspond to, and be disposed adjacent to, around, or around and adjacent to at least one of the surface-mounting structures. Similarly, each indicator may be disposed adjacent to, around, or adjacent to and around the surface-mounting structure corresponding to each indicator's corresponding detector. In some embodiments, the detector is disposed on a surface-mounting side of the base plate. The indicator may be disposed along a side of the base plate opposite the surface-mounting side. The detector may be mounted along the outside surface of the channel, and the indicator may be mounted along the inside surface of the channel.

The indicators may provide visual, audio, or visual and audio feedback to a user that the surface-mounting structure associated with each indicator is aligned with a feature, such as a stud, a screw/nail head, a pipe, or wiring. Accordingly, the indicators may include a plurality of LEDs, each LED corresponding to at least one detector. The LED may be disposed closer to the surface-mounting structure corresponding to the detector than to any other surface-mounting structure, thereby notifying a user that particular LED corresponds to that particular surface-mounting structure. For example, a user may install a channel overhead. The channel may include a base and walls, the base having openings through which lag screws mount the channel to the ceiling. Each opening may have a corresponding detector and LED. The LED may emit light towards the inner portion of the channel facing the user. The LED may emit light when the detector detects a truss behind the ceiling.

In general, the controller may include a computer readable storage medium (or media) having readable program instructions thereon for causing a processor integrated with the controller to carry out various processes as described herein. For example, the computer program product may include firmware programmed on a controller and/or microcontroller.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, a chemical memory storage device, a quantum state storage device, or any suitable combination of the foregoing. A non-exhaustive list of more specific examples of the computer readable storage medium includes the following: a hard disk, a random access memory (RAM), a read-only memory (ROM), an erasable programmable read-only memory (EPROM or Flash memory), a static random access memory (SRAM), a memory stick, A computer readable storage medium, as used herein, is not to be construed as being transitory signals per se, such as radio waves or other freely propagating electromagnetic waves, electromagnetic waves propagating through a waveguide or other transmission media (e.g., light pulses passing through fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming languages such as Smalltalk, C++ or the like, and conventional procedural programming languages such as the "C" programming language or similar programming languages. Computer program code for implementing the invention may also be written in a low-level programming language such as assembly language.

In some embodiments, electronic circuitry including, for example, programmable logic circuitry, field-programmable gate arrays (FPGA), or programmable logic arras (PLA) may execute the computer readable program instructions by utilizing state information of the computer readable program instructions to personalize the electronic circuitry, in order to perform aspects of the present invention.

These computer readable program instructions may be provided to a processor of a general-purpose computer, special purpose computer, embedded system, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified herein.

The controller may be electrically connected to the detectors. The controller may be electrically connected to the indicators. The controller may activate the indicators as the detectors detect a feature obscured behind a surface adjacent to the detectors. For example, the controller may be mounted to an inner surface of the channel, and may be electrically connected to each of the detectors and indicators integrated with the channel. Similarly, the power source may be electrically connected to the controller, the detectors, and/or the indicators. The power source may be mounted to the inner surface of the channel.

Various specific embodiments of the apparatus described above are depicted in the appended FIGs. and described below regarding those FIGs. The depicted and described embodiments shall be understood to be example embodiments of the apparatus described above and in the claims.

Figure 1B:
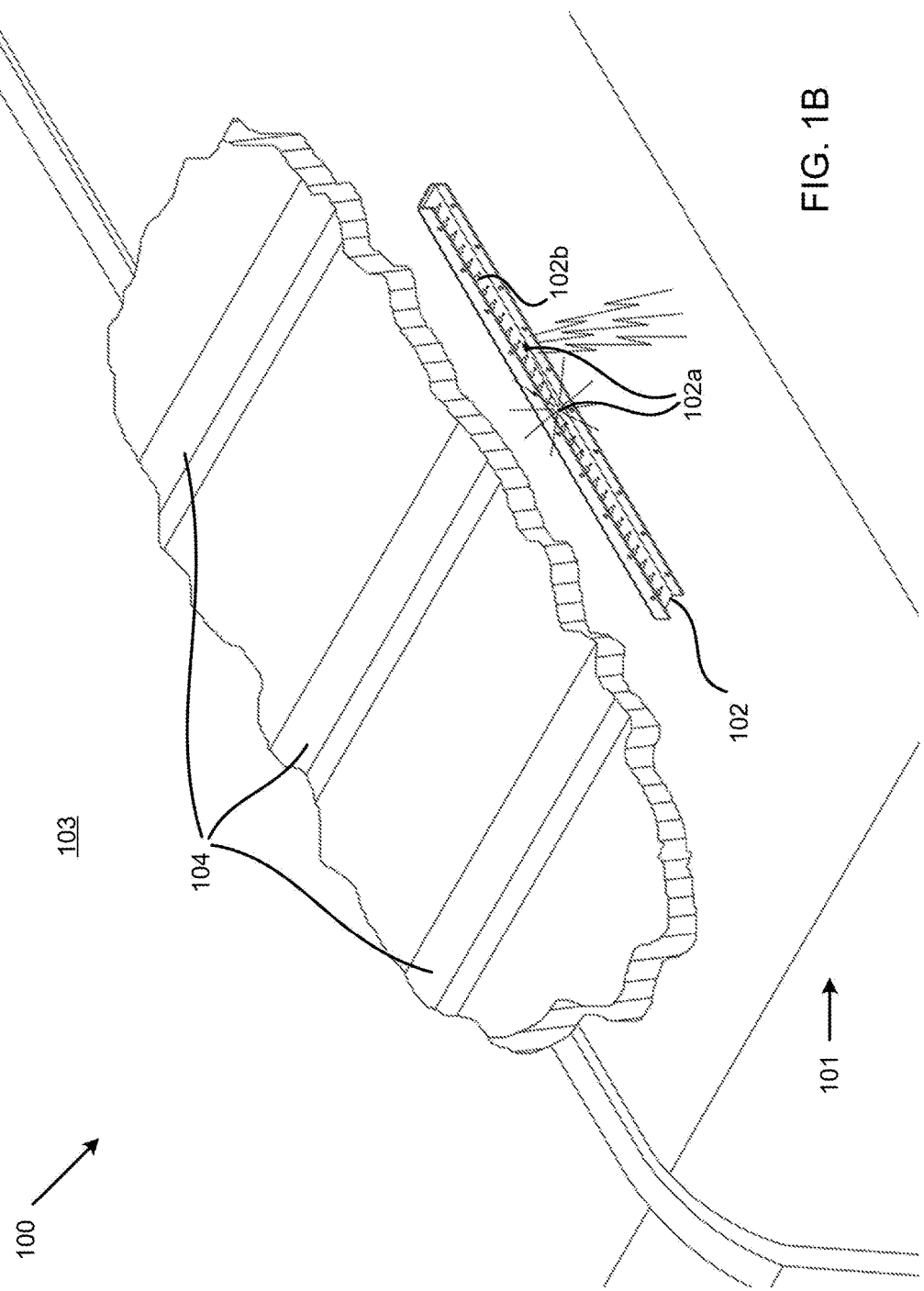

FIGS. 1A-B depict a scene of a device-to-surface mounting apparatus being installed overhead in a garage. The scene 100 is depicted in a garage 101 where the apparatus 102 is mounted to the ceiling 103. Trusses 104 are disposed behind the ceiling, and are not visible to an installer of the apparatus 102. The apparatus 102 includes indicators 102a that inform an installer of the apparatus 102 that openings 102b in the apparatus 102 are aligned with the trusses 104. As shown in FIG. 1A, none of the openings 102b are aligned with any of the trusses 104. As shown in FIG. 1B, two openings 102b are aligned with two trusses 104, and indicators 102a are emitting light and sound to notify the installer of the alignment.

Figure 2:
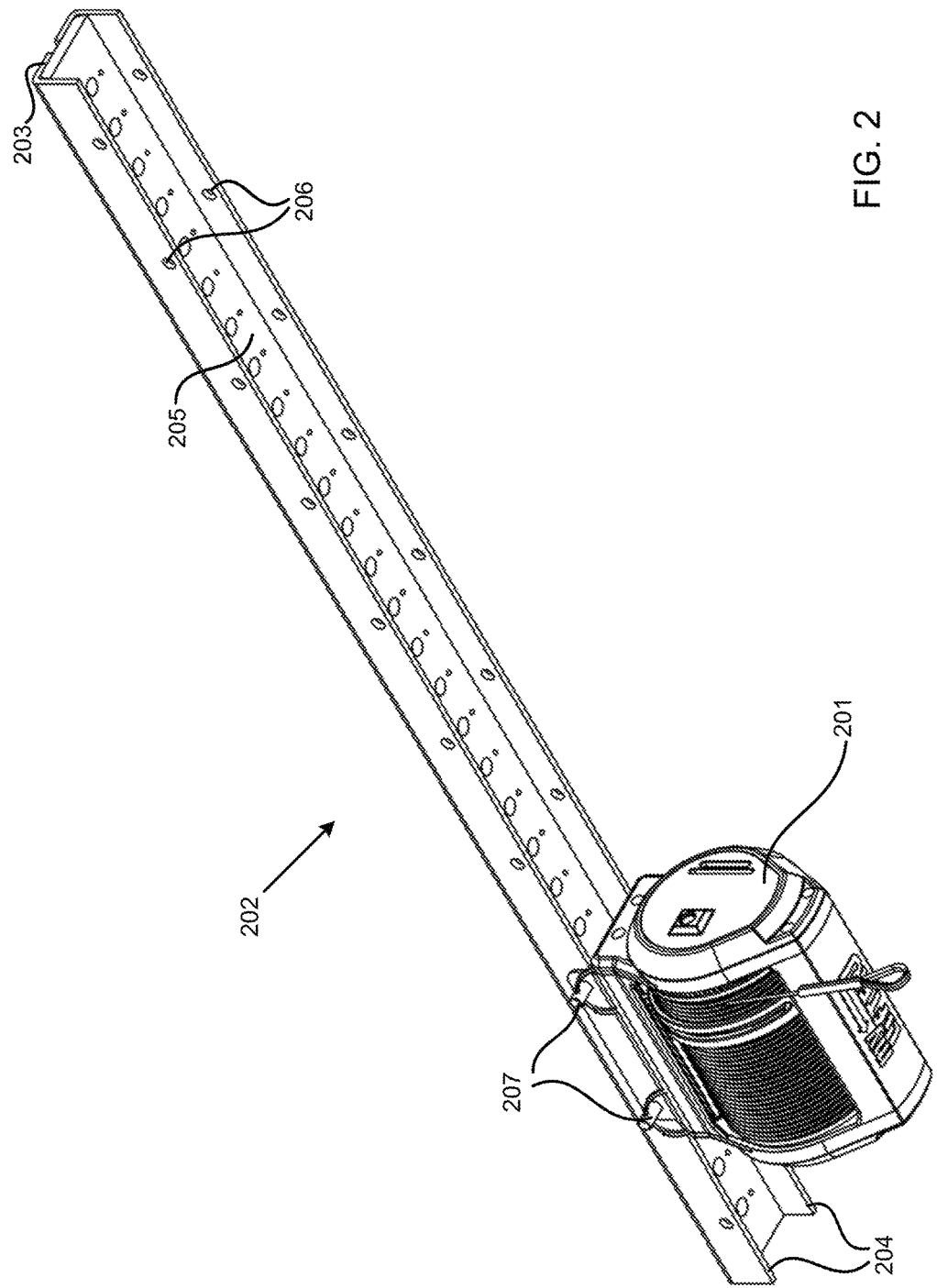
FIG. 2 depicts a view of a device mounted to a device-to-surface mounting apparatus.

FIG. 2 depicts a view of a device mounted to a device-to-surface mounting apparatus. A compact motorized lifter 201 is mounted to the apparatus 202. The apparatus 202 is formed as a channel, having a base 203, opposing walls 204, and a removable detector/indicator 205. The walls 204 extend perpendicularly from opposing sides of the base 203. The walls 204 include coaxial openings 206 that pass through the opposing walls 204. The openings 206 are one embodiment of various device-mount structures by which one or more devices, such as the lifter 201, may be mounted to the walls. Rods 207 pass through the openings 206 to mount the lifter 201 to the walls 204. The removable detector/indicator 205 includes openings 208 corresponding to openings in the base 203. The openings in the base 203 are one embodiment of surface-mounting structures by which the channel may be mounted to a surface. Lag screws may be passed to mount the channel to a surface.

Figure 3:
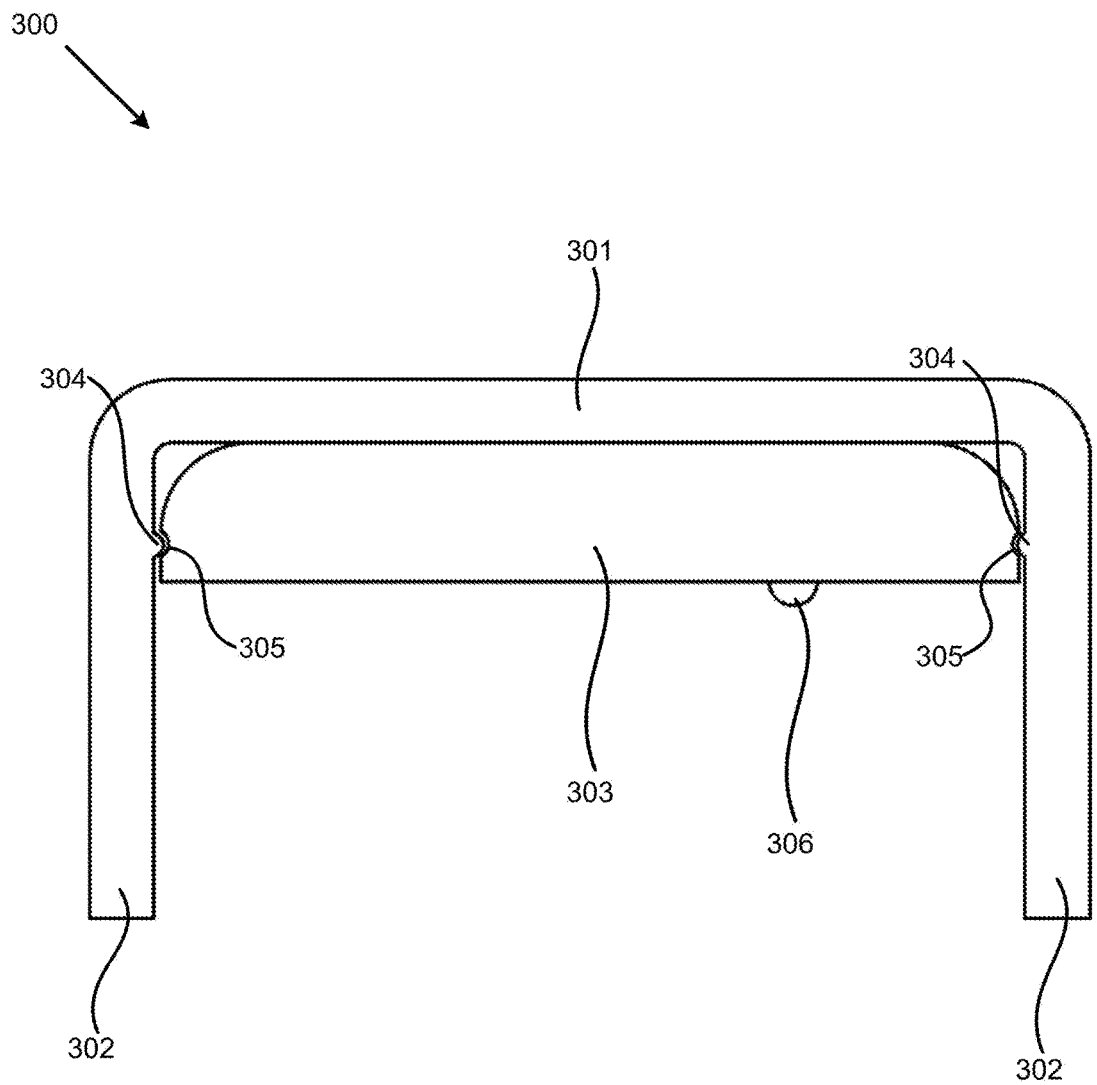
FIG. 3 depicts a front view of a device-to-surface mounting apparatus.

FIG. 3 depicts a front view of a device-to-surface mounting apparatus. The apparatus 300 comprises a channel formed of a base 301, and two walls 302 extending perpendicularly from opposing sides of the base 301. A removable detector/indicator body 303 is disposed adjacent to the base 301 and fixed in the channel by runners 304 and tracks 305. The body 303 includes LEDs 306 oriented to emit light towards an inner portion 307 of the channel. The LEDs are one embodiment of the obscured feature indicators described herein.

Figure 4:
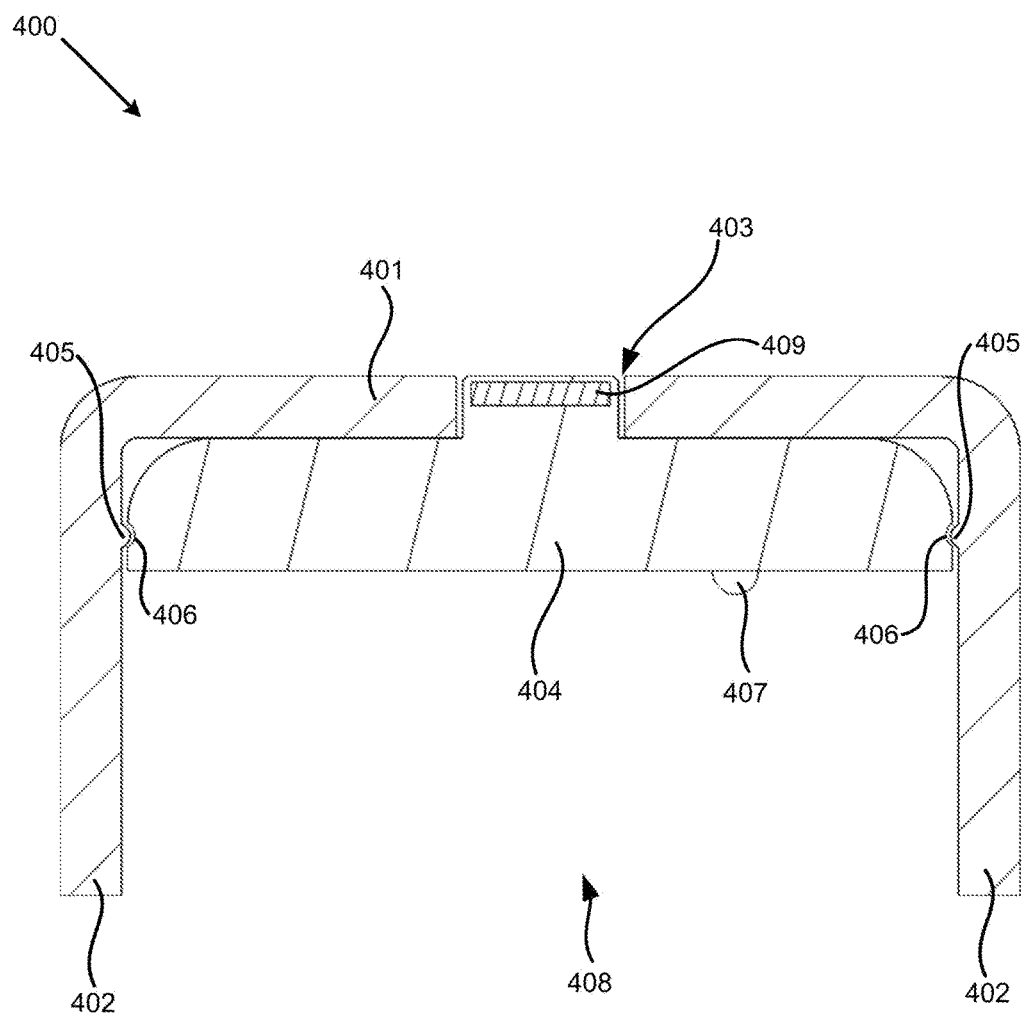
FIG. 4 depicts a front cross-section view of a device-to-surface mounting apparatus.

FIG. 4 depicts a front cross-section view of a device-to-surface mounting apparatus. The apparatus 400 comprises a channel formed of a base 401, and two walls 402 extending perpendicularly from opposing sides of the base 401. An opening 403 is formed in the base 401. The opening 403 is one embodiment of a surface-mounting structure. A removable detector/indicator body 404 is disposed adjacent to the base 401 and fixed in the channel by runners 405 and tracks 406. The body 404 includes an LED 407 oriented to emit light towards an inner portion 408 of the channel. The LED 407 is one embodiment of the obscured feature indicators described herein. The body 404 also includes an obscured feature detector 409 disposed in the opening 403. The LED 407 corresponds to the detector 408 and the opening 403, and is disposed closer to the opening 403 than to any other opening in the base 401.

Figure 5:
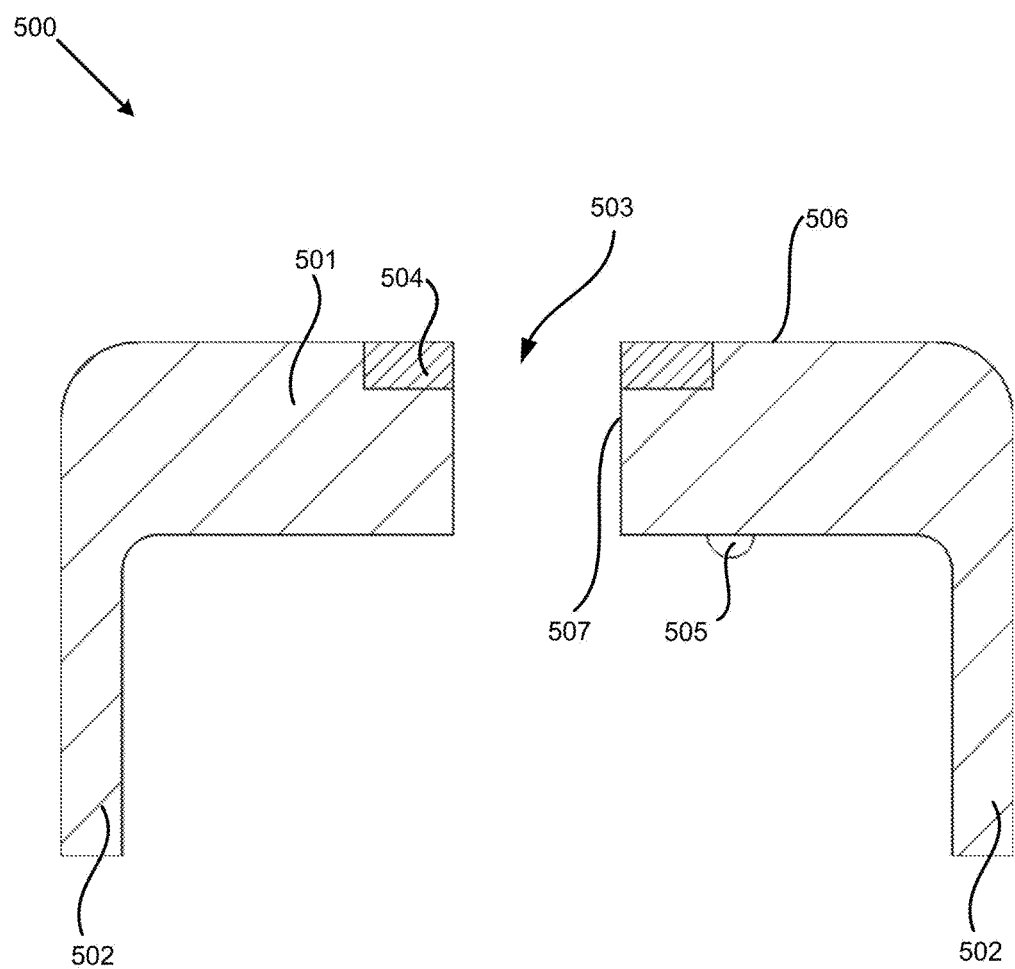
FIG. 5 depicts a front cross-sectional view of another device-to-surface mounting apparatus embodiment.

FIG. 5 depicts a front cross-sectional view of another device-to-surface mounting apparatus embodiment. The apparatus 500 comprises a channel formed of a base 501, and two walls 502 extending perpendicularly from opposing sides of the base 501. An opening 503 is formed in the base 501. The opening 503 is one embodiment of a surface-mounting structure. The apparatus 500 further includes an obscured feature detector 504 disposed in the base 501 around, and adjacent to, the opening 503, and an obscured feature indicator 505 corresponding to the detector 504 and disposed adjacent to the opening 503. The detector 504 is disposed along an outer surface 506 of the base 501 such that the detector 504 is parallel and coplanar with the surface 506. The surface 506 is a surface-mounting-side face of the base 501. The detector 504 may include one or more plate capacitors, one or more magnets, one or more inductors, an RF or ultrasonic transmitter-receiver set, or combinations thereof. The detector may be ring-shaped, such as a ring-shaped capacitor or a ring-shaped magnet. The indicator 505 is disposed along a side of the base 501 opposite the surface 506. The indicator 505 is disposed closer to the opening 503 than any other opening in the base 501. The indicator 505 is oriented towards an inner portion 507 of the channel. As shown, the detector 504 and indicator 505 are integrated with the base 501.

Figure 6A:
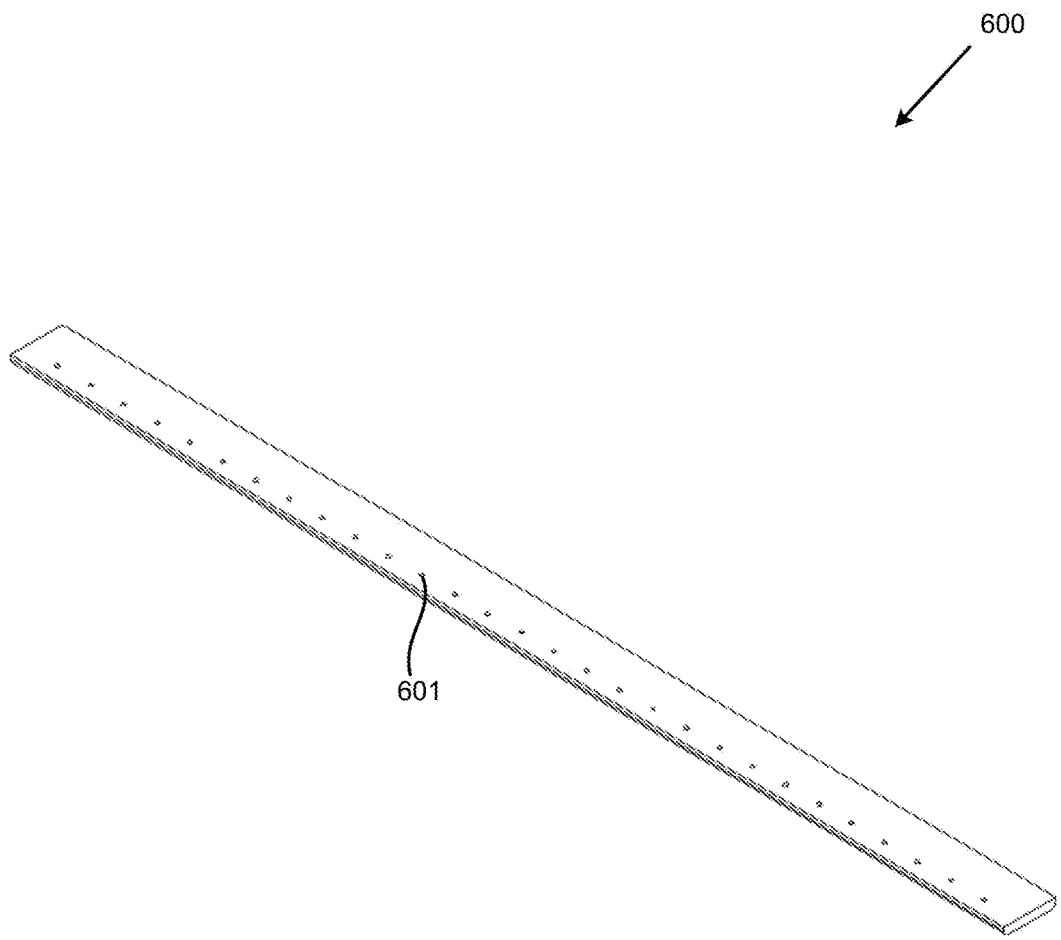
FIGS. 6A-B depict top and bottom isometric views of a detector/indicator body that may be removably installed in a channel.
Figure 6B:
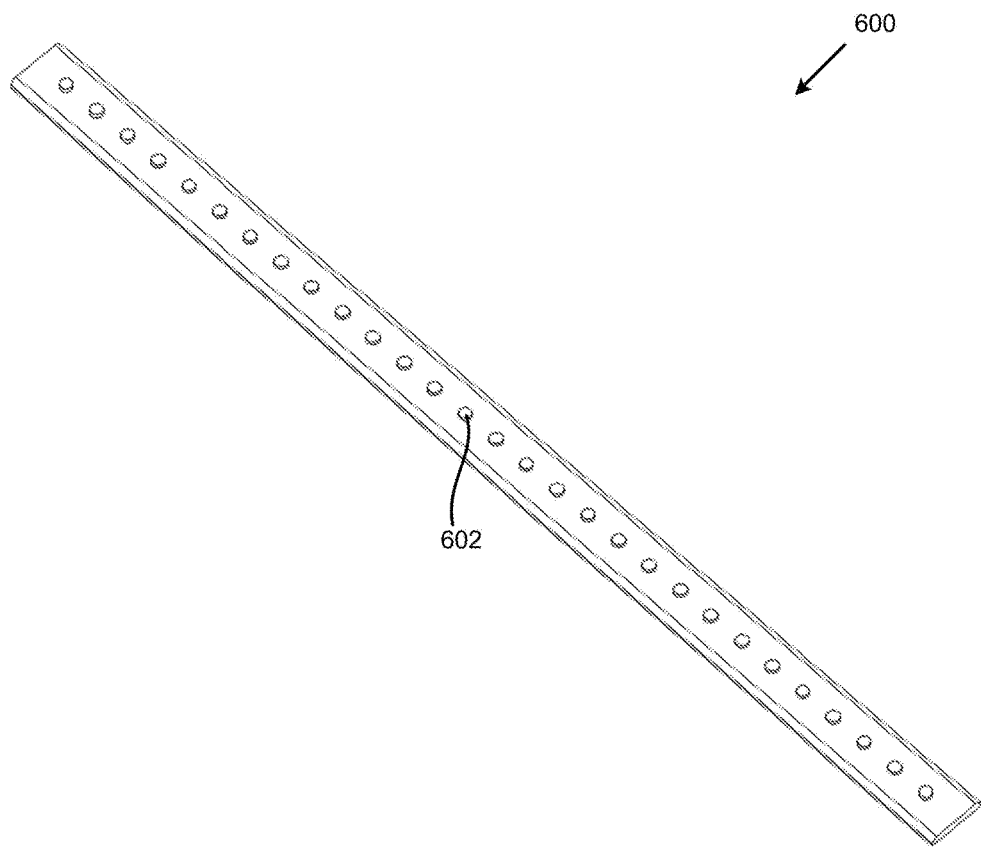

FIGS. 6A-B depict top and bottom isometric views of a detector/indicator body that may be removably installed in a channel. As shown in FIG. 6A, the body 600 includes a plurality of LEDs 601. The LEDs 601 are one embodiment of the obscured feature indicators described herein. As shown in FIG. 6B, the body 600 also includes a plurality of obscured feature detectors 602. The detectors 602 protrude from the body 600. Each detector 602 corresponds to one LED 601 on the opposite side of the body 600 such that, as the detector 602 detects an obscured feature, the corresponding LED 601 illuminates. The body 600 may be connected to a channel. The channel may include surface-mounting structures, such as openings. The detectors 602 may protrude into the openings. The body 600 may mount to the channel by one or more sets of tracks and runners, by one or more magnets, by one or more clips, or combinations thereof.

Figure 7A:
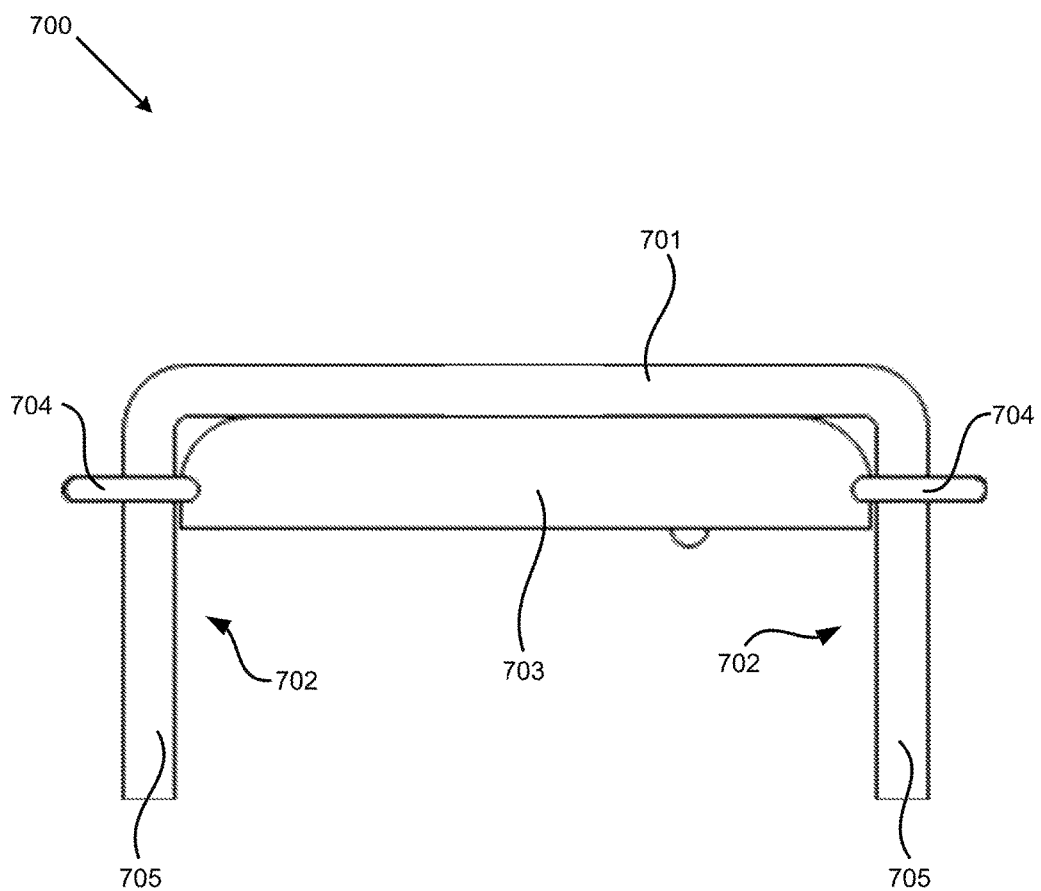
FIGS. 7A-B depict various views of one embodiment of a device-to-surface mounting apparatus with a removeable detector/indicator body.
Figure 7B:
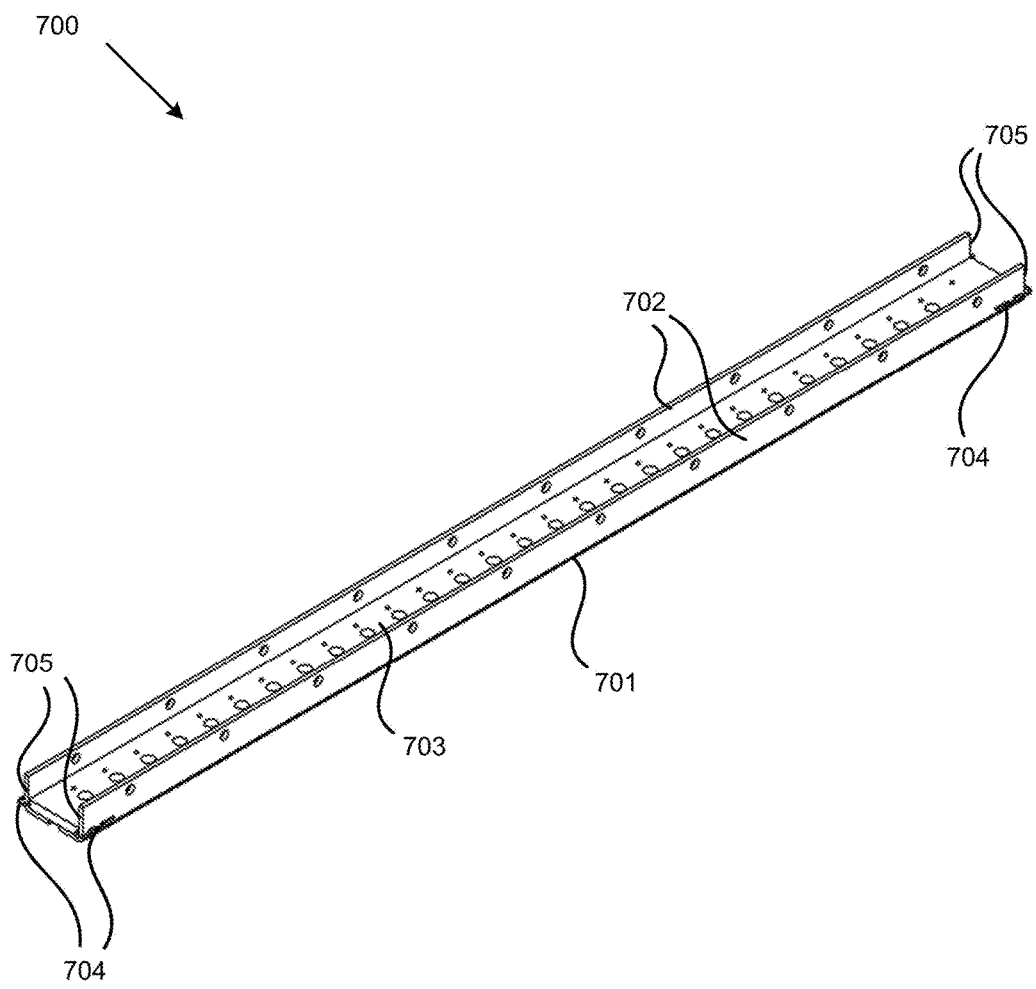

FIGS. 7A-B depict various views of one embodiment of a device-to-surface mounting apparatus with a removeable detector/indicator body. The apparatus 700 includes a channel having a surface-mounting base plate 701, device-mounting walls 702, and a removeable detector/indicator body 703. The body 703 is held in the channel by two clips 704 at each end of the body 703. The clips 704 wrap around the ends 705 of the walls 702.

Figure 8A:
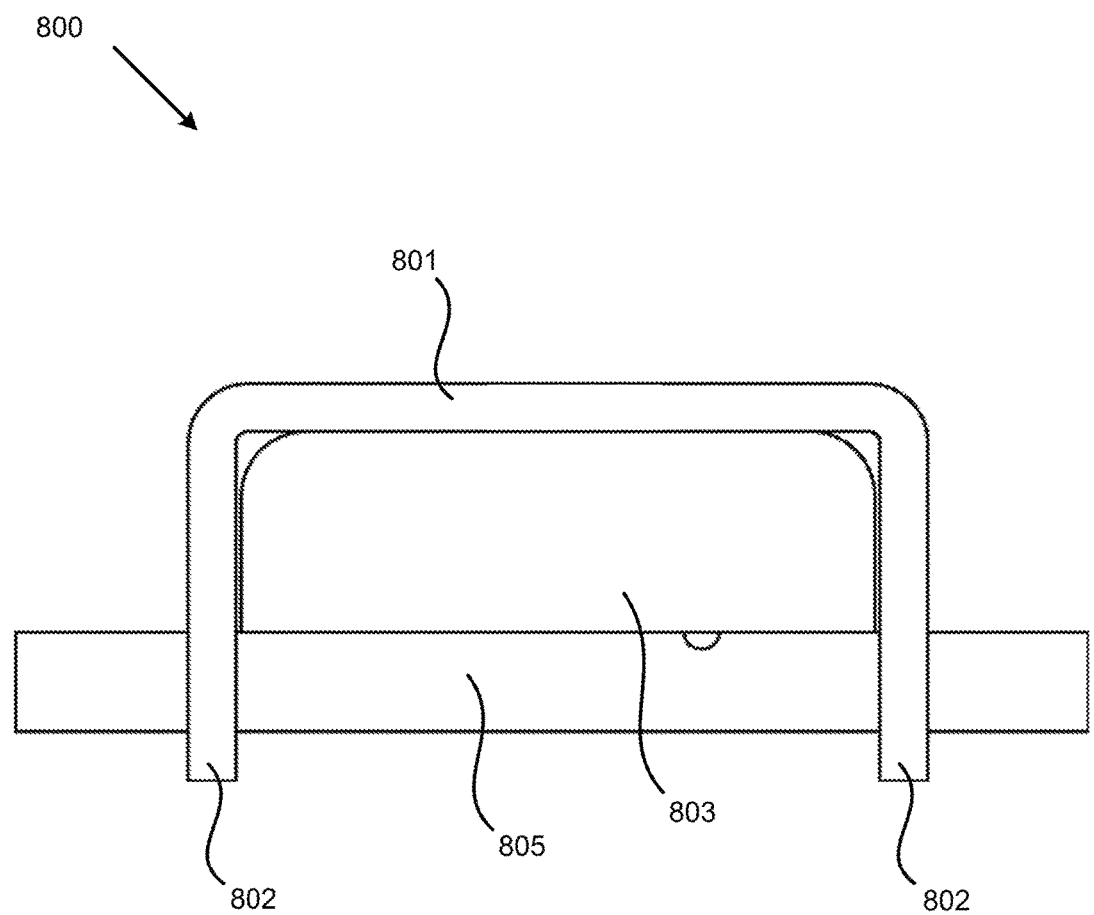
FIGS. 8A-B depict various views of another embodiment of a device-to-surface mounting apparatus with a removeable detector/indicator body.
Figure 8B:
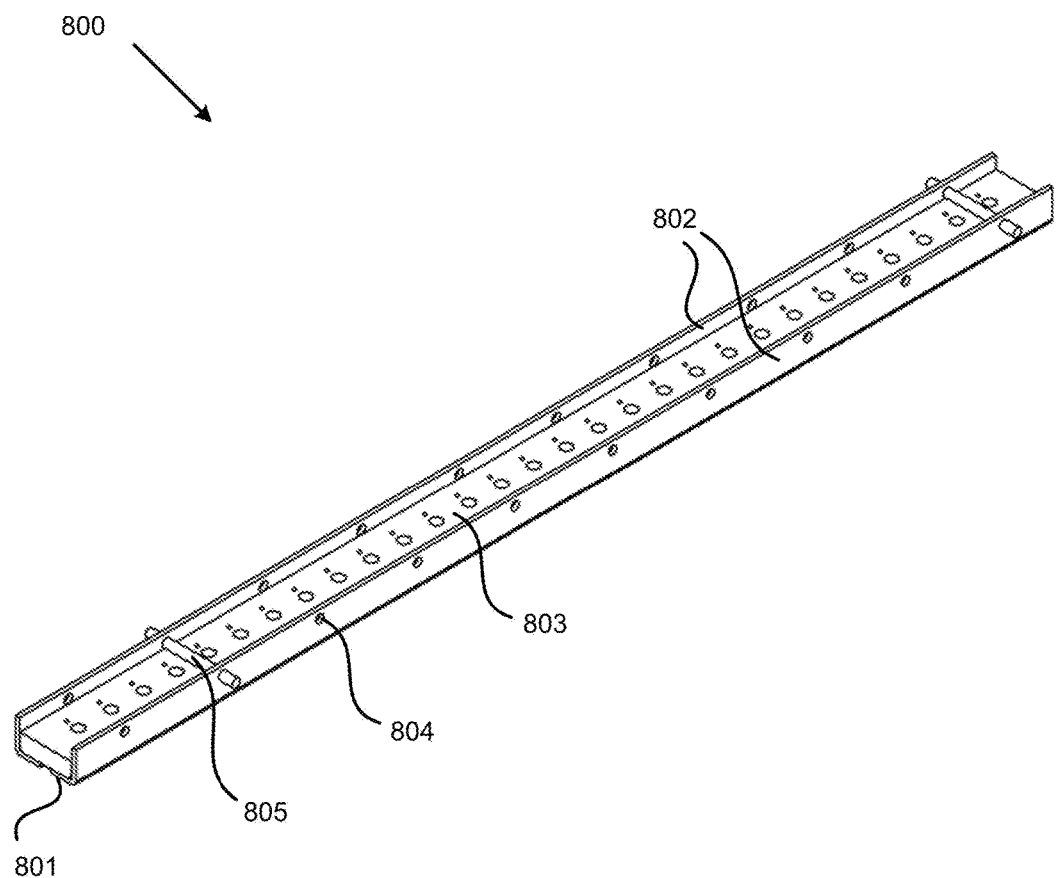

FIGS. 8A-B depict various views of another embodiment of a device-to-surface mounting apparatus with a removeable detector/indicator body. The apparatus 800 includes a channel having a surface-mounting base plate 801, device-mounting walls 802, and a removeable detector/indicator body 803. The walls 802 include coaxial openings 804 in the walls 802. The body 803 is held in the channel by rods 805 passing through the coaxial openings 804. The body 803 is pinned between the rods 805 and the base plate 801.

Figure 9:
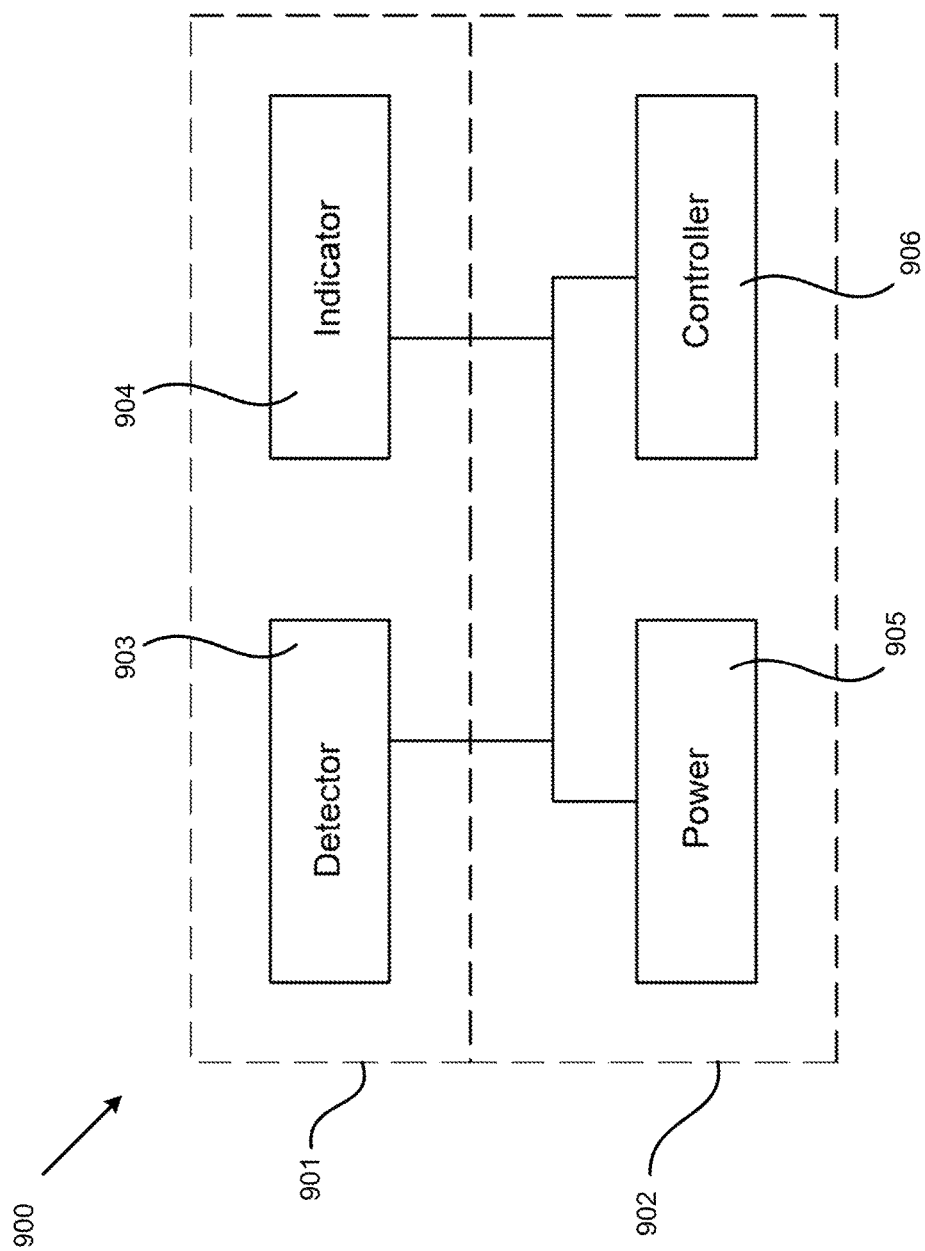
FIG. 9 is a generic system view of various embodiments of a device-to-surface mounting apparatus as described herein.

FIG. 9 is a generic system view of various embodiments of a device-to-surface mounting apparatus as described herein. The system 900 includes elements 901 specific to each surface-mounting structure, and elements 902 interconnected with each surface-mounting structure element 901. The elements 901 include an obscured feature detector 903 and an obscured feature indicator 904. The elements 902 include a power source 905 and a controller 906. The power source provides electrical power to, and is therefore electrically connected to, the detector 903, the indicator 904, and the controller 906. The controller 906 is also electrically connected to the detector 903 and the indicator 904. Depending on the embodiment, the detector 903 may be directly electrically connected to the indicator 904, such as where the detector is an inductor and the indicator is an LED. However, the controller 906 may store instructions that, upon receiving an expected signal from the detector 903, may activate the indicator 904. Thus, the detector 903 and indicator 904 may not necessarily be directly electrically connected.

Figure 10:
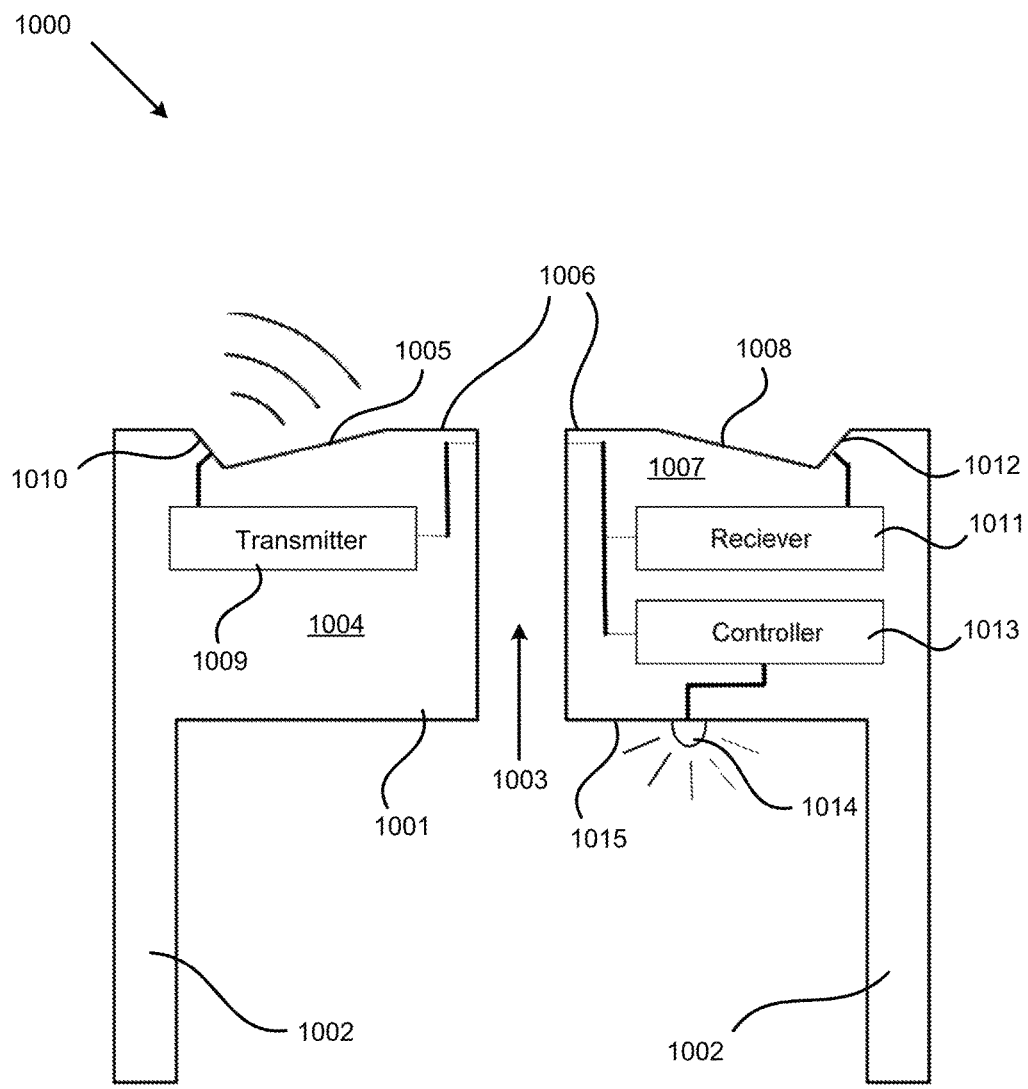
FIG. 10 depicts a system view specific to a particular structure of a device-to-surface mounting apparatus as described herein.

FIG. 10 depicts a system view specific to a particular structure of a device-to-surface mounting apparatus as described herein. The apparatus 1000 includes a channel formed of a base 1001 and two opposing walls 1002 extending from the base 1001. The base 1001 includes an opening 1003 passing through the base 1001, and through which a lag screw may be passed to mount the apparatus 1000 to a surface. On a first side 1004 of the opening 1003, a first waveguide 1005 is formed in a surface-mounting side 1006 of the base 1001. On a second side 1007 of the opening 1003, a second waveguide 1008 is formed in the surface-mounting side 1006 of the base 1001. A transmitter 1009 is connected to a transmitter antenna 1010 at a base of the first waveguide 1005. A receiver 1011 is connected to a receiver antenna 1012 at a base of the second waveguide 1008. A controller 1013 is electrically connected to the transmitter 1009 and the receiver 1011. The controller 1013 is also electrically connected to an indicator 1014 on an inside surface 1015 of the channel. The controller 1013 stores and executes instructions to activate the indicator 1014 upon the receiver receiving an RF signal corresponding to an expected signal stored on the controller and corresponding to an obscured feature detection. Although depicted as an RF embodiment, a similar arrangement may be found in embodiments that employ ultrasonic detection. In such embodiments, the transmitter antenna 1010 may be a speaker, and the receiver antenna 1012 may be a microphone. The transmitter 1009 may convert one or more digital signals into mechanical pulses, and the receiver 1011 may convert one or more mechanical pulses into digital signals. The controller 1013 may instruct the transmitting of a frequency and may interpret received frequencies.

Figure 11A:
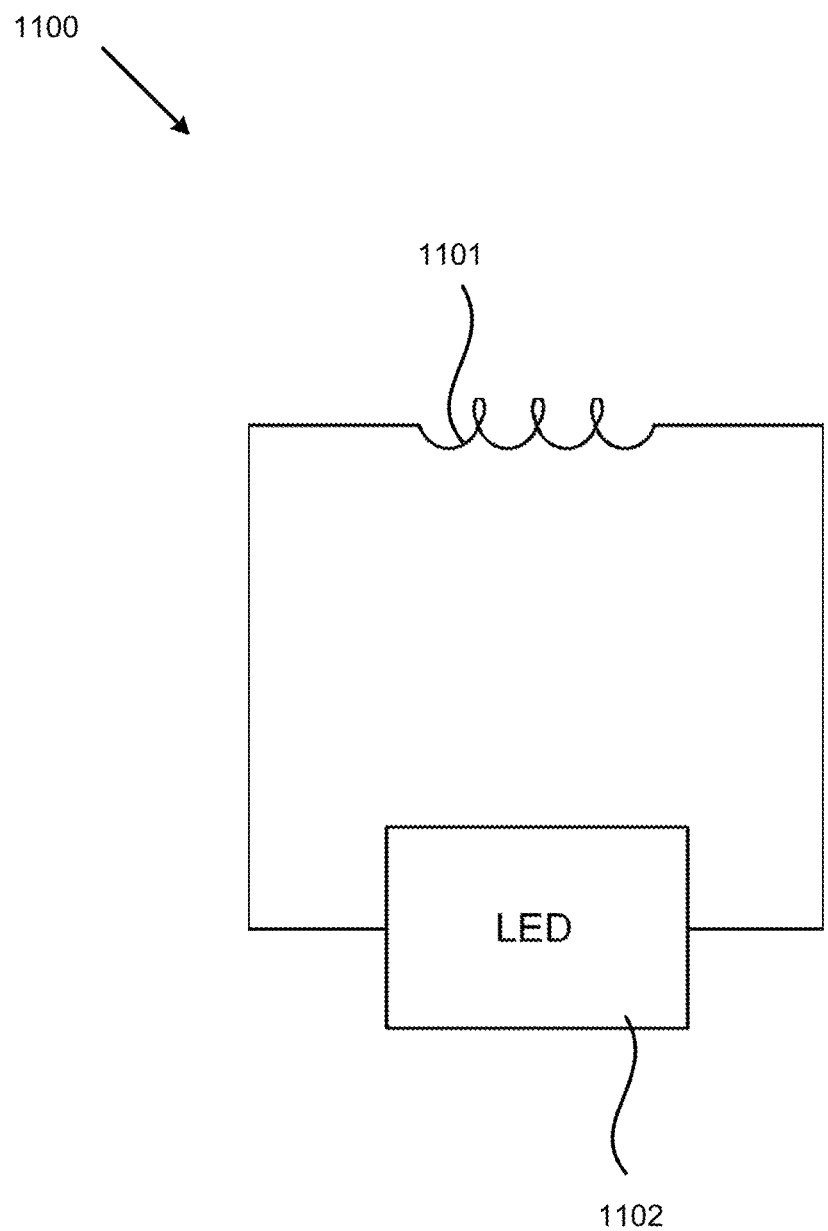
FIGS. 11A-C depict various system views of device-to-surface mounting apparatuses incorporating different types of detectors.
Figure 11B:
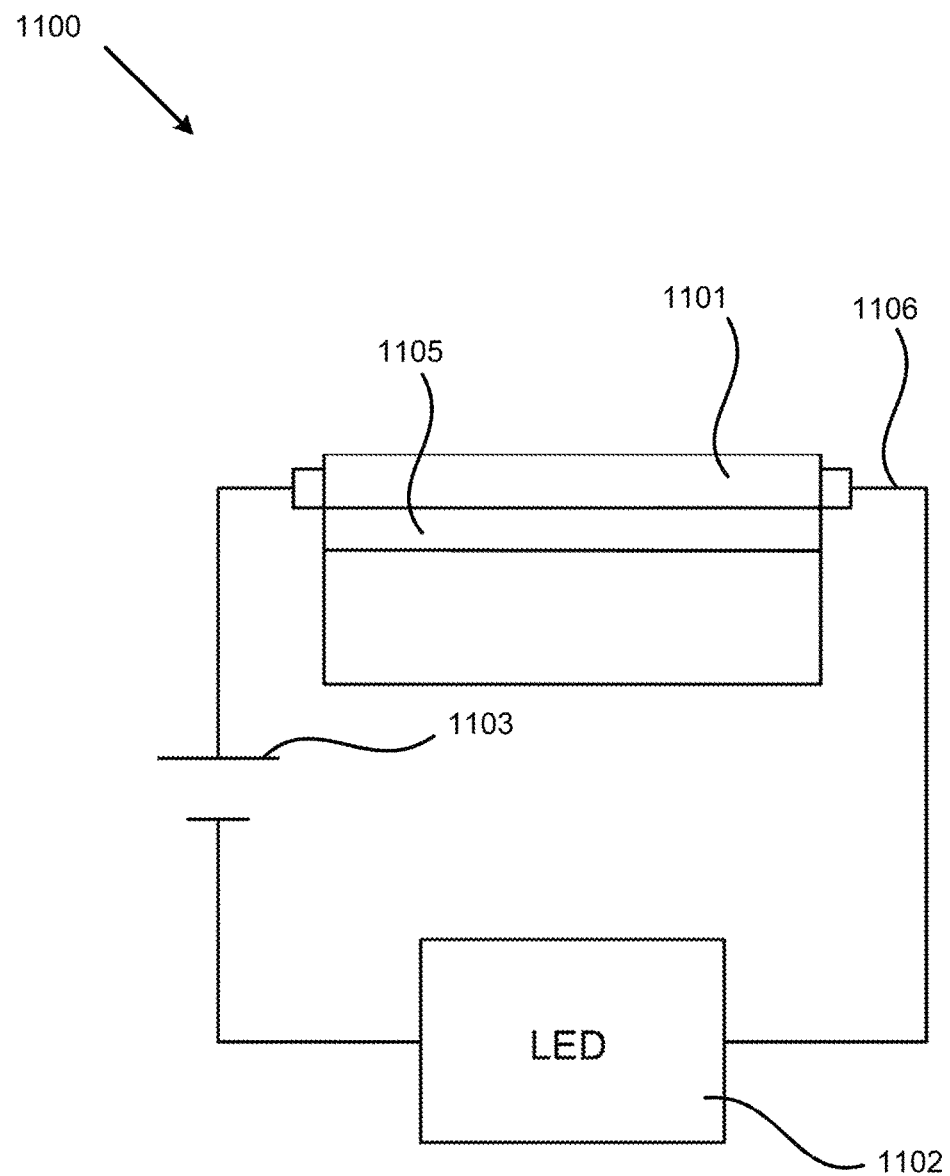
Figure 11C:
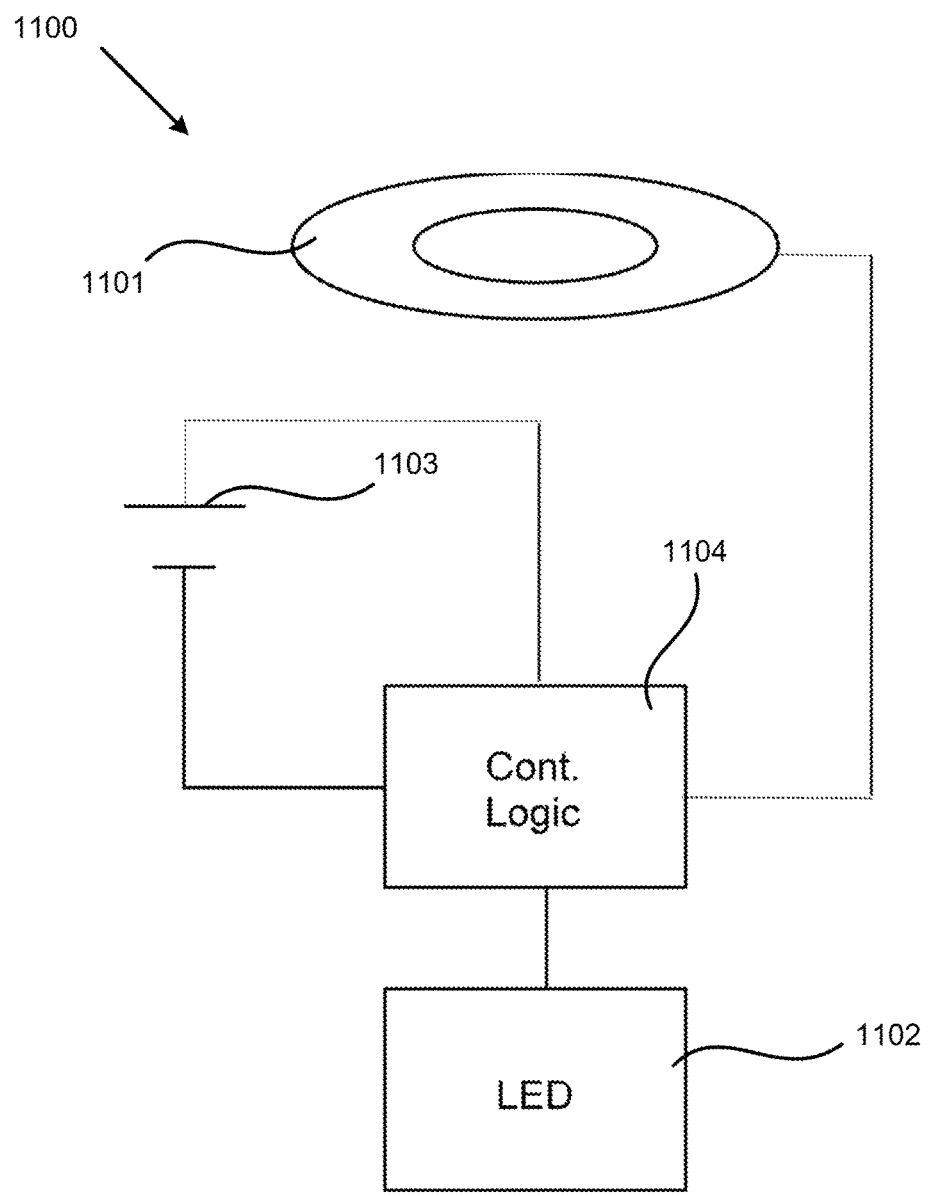

FIGS. 11A-C depict various system views of device-to-surface mounting apparatuses incorporating different types of detectors. In general, the apparatus 1100 includes a detector 1101 and an indicator 1102. FIG. 11B depicts an embodiment that incorporates a battery 1103, and FIG. 11C depicts an embodiment that incorporates the battery 1103 and a controller 1104. FIG. 11A depicts an embodiment wherein the detector 1101 is an inductor and the indicator 1102 is an LED. FIG. 11B depicts an embodiment wherein the detector 1101 is a cylindrical magnet. The magnet includes an electrical contact 1105 the extends across the magnet. The magnet may be slidably disposed in a shaft such that, as the magnet is attracted to metal obscured behind a surface, the magnet slides in the shaft, causing the contact 1105 to close a circuit 1106 with the battery 1103 and the indicator 1102. FIG. 11C depicts an embodiment wherein the detector 1101 is a ring-shaped plate capacitor. The capacitor plate is disposed around a surface-mounting structure in the apparatus 1100, and is connected to the controller 1104. The controller 1104 detects variation in the charge-carrying capacity of the capacitor plate, which varies depending on the dielectric constant of the materials surrounding the capacitor plate. The capacitor plate may be flush with the surface-mounting side of the base plate, and may accordingly rest against the mounting surface. As the features behind the surface change, the charge-carrying capacity of the plate changes. Methods and logic for measuring the charge-carrying capacity of the plate is known, such as is described in U.S. Pat. No. 4,099,118.

We claim:

1. A device-to-surface mounting apparatus, comprising:
 a channel comprising a base, two walls extending perpendicularly from opposing sides of the base, and a plurality of openings disposed in the base, wherein one or more devices mount to the walls;
 a plurality of ring-shaped plate capacitors, each capacitor corresponding to, and encircling, at least one of the openings, the capacitors disposed within the channel along an outer surface of the base;
 a plurality of LEDs, each LED corresponding to at least one of the capacitors and disposed closer to the at least one opening corresponding to the at least one corresponding capacitor than any other opening, the LEDs oriented to emit light towards an inner portion of the channel;
 a controller electrically connected to the capacitors and the LEDs, wherein the controller lights LEDs corresponding to capacitors that indicate to the controller alignment of the corresponding openings over studs behind a surface adjacent to the channel; and
 a battery providing power to the controller, the LEDs, and the capacitors.

2. The device-to-surface mounting apparatus of claim 1, wherein the channel base comprises plurality of external cleats comprising barbs protruding from the base for hands-free positioning on a mounting surface.

3. A device-to-surface mounting apparatus, comprising:
 a channel comprising a base, two walls extending perpendicularly from opposing sides of the base, and a plurality of openings disposed in the base, wherein one or more devices mount to the walls;
 a plurality of RF transmitters and transmitter antennas, each transmitter corresponding to at least one of the openings, and each transmitter antenna electrically connected to at least one of the transmitters, disposed adjacent to the at least one corresponding opening, and facing outside the channel, wherein each transmitter is tuned to a frequency unique from each other transmitter;
 a plurality of RF receivers and receiver antennas, each receiver corresponding to at least one of the transmitters, and each receiver antenna electrically connected to at least one of the receivers, disposed adjacent to the at least one corresponding opening opposite the corresponding transmitter antenna, and facing outside the channel, wherein each receiver is tuned to the corresponding transmitter frequency;
 a plurality of LEDs, each LED corresponding to at least one receiver and disposed closer to the at least one opening corresponding to the at least one corresponding transmitter than any of the other openings, the LEDs oriented to emit light towards an inner portion of the channel;
 a controller electrically connected to the transmitters, the receivers, and the LEDs, wherein the controller lights LEDs corresponding to receivers that receive signals from corresponding transmitters indicating to the controller alignment of the corresponding openings over studs behind a surface adjacent to the channel; and
 a battery providing power to the controller, the LEDs, the transmitters, and the receivers.

4. A device-to-surface mounting apparatus, comprising:
 a base plate comprising one or more surface-mounting structures by which the apparatus is mounted to a surface;
 one or more walls extending at least partially perpendicularly from the base, the walls comprising one or more device-mount structures by which one or more removable devices are mounted to the walls;
 one or more obscured feature detectors connected to the base, the walls, or both, each obscured feature detector corresponding to at least one of the one or more surface-mounting structures;
 one or more obscured feature indicators connected to the base, the walls, or both, each obscured feature indicator corresponding to at least one of the one or more obscured feature detectors; and
 a controller electrically connected to the detectors and indicators, and a power source electrically connected to the controller, the detectors, and the indicators, wherein the controller activates the indicators as the detectors detect a feature obscured behind a surface adjacent to the detectors.

5. The apparatus of claim 4, further comprising at least two opposing walls, wherein the base and the walls form a channel.

6. The apparatus of claim 5, wherein at least two of the one or more device-mount structures include coaxial openings through the opposing walls.

7. The apparatus of claim 4, wherein at least one of the one or more surface-mounting structures comprises an opening through the base.

8. The apparatus of claim 7, wherein the obscured feature detectors are removably disposed in the openings.

9. The apparatus of claim of claim 4, wherein the obscured feature detectors are disposed adjacent to the surface-mounting structures, around the surface-mounting structures, or combinations thereof.

10. The apparatus of claim of claim 4, wherein the obscured feature indicators are disposed adjacent to the surface-mounting structures, around the surface-mounting structures, or combinations thereof.

11. The apparatus of claim 4, wherein the obscured feature detectors are integrated with the base, the walls, or both.

12. The apparatus of claim 4, wherein the obscured feature indicators are integrated with the base, the walls, or both.

13. The apparatus of claim 4, wherein a face of at least one obscured feature detector is parallel and coplanar with a surface-mounting-side face of the base plate.

14. The apparatus of claim 13, wherein at least one of the obscured feature indicators is disposed along a side of the base plate opposite the surface-mounting-side face.

15. The apparatus of claim 4, wherein the obscured feature detector comprises a capacitor, a magnet, an inductor, an ultrasonic transmitter and receiver, an RF transmitter and receiver, or combinations thereof.

16. The apparatus of claim 4, wherein at least one of the one or more obscured feature detectors comprises a ring-shaped plate capacitor encircling at least one of the one or more surface-mounting structures.

17. The apparatus of claim 4, wherein at least one of the one or more obscured feature detectors comprises a ring-shaped magnet disposed around at least one of the one or more surface-mounting structures.

18. The apparatus of claim 4, wherein at least one of the one or more obscured feature detectors comprises an RF transmitter and an RF receiver, the transmitter disposed adjacent to at least one of the surface-mounting structure, and the receiver disposed adjacent to the at least one surface-mounting structure opposite the transmitter.

19. The apparatus of claim 4, wherein at least one of the one or more obscured feature detectors comprises an ultrasonic transmitter and an ultrasonic receiver, the transmitter disposed adjacent to at least one of the surface-mounting structure, and the receiver disposed adjacent to the at least one surface-mounting structure opposite the transmitter.

20. The apparatus of claim 4, wherein the obscured feature detectors and the obscured feature indicators are integrated into a body removable from the base, the walls, or both, wherein the removable body connects to the base, the walls, or both by one or more sets of tracks and runners, by one or more magnets, by one or more clips, or combinations thereof.

* * * * *